Patented Feb. 10, 1931

1,791,800

UNITED STATES PATENT OFFICE

JAMES H. COLTON, OF BERKELEY, CALIFORNIA, ASSIGNOR TO PACIFIC PORTLAND CEMENT COMPANY, CONSOLIDATED, A CORPORATION OF CALIFORNIA

PROCESS OF MANUFACTURING PORTLAND CEMENT

No Drawing.  Application filed February 4, 1926.  Serial No. 86,097.

This invention relates to a process of manufacturing Portland cement.

An object of the present invention is to provide a process for manufacturing Portland cement by which the cement may be calcined and clinkered at lower temperatures than can be employed under the standard methods of manufacturing Portland cement.

Another object of the present invention is to provide a process for manufacturing Portland cement which will produce a quick-hardening cement producing high early tensile strengths and high early compression strength.

Another object of the present invention is to provide a process of manufacturing Portland cement with improved quick-hardening and high tensile and compression strength without changing the chemical analysis of the ordinary mix used in the production of standard Portland cements.

I have discovered that if in the calcining of Portland cement, a quantity of previously calcined and ground cement clinker is added to the raw mix, the calcining of the mix may proceed at a lower temperature than is usually necessary and the resultant cement clinker gives a higher early strength and possesses superior hardening qualities than the Portland cement resulting from the standard methods of production. The particular reasons why the addition of such pre-burned and ground clinker to the raw mix should produce these results is not definitely known but it is believed that the pre-burned, ground clinker acts as a catalyzer during the calcining operation and brings about a better combination of the calcium aluminum silicates present. By "ground clinker" is meant the finely divided or granular Portland cement in unhydrated or unset condition resulting from the steps of burning a cement mix to form a clinker, and then grinding the clinker to a fine state of division.

In order to fully disclose the preferred method of practicing the present invention as well as disclose additional objects and advantages which will be derived by the method, a preferred example of a process of manufacturing Portland cement embodying the present invention will be hereafter described.

There is first produced a cement clinker by the use of such materials as are ordinarily employed in the making of Portland cement, that is to say, there is first prepared a raw mix of such materials as lime rock and clay, or lime rock and shale, or marl and sea shells and clay, and this raw mix is then clinkered as in the ordinary process of producing Portland cement clinker. The clinker thus produced is then ground either with or without the addition of calcium sulfate, preferably the calcium sulfate not being added.

The ground clinker thus produced may then be returned to the kiln and reburnt to a point where it is again clinkered after which the twice-clinkered material may then be ground and utilized in the usual manner to form a finished Portland cement.

I prefer, however, to take the first produced clinker after the same is ground and add a portion of this ground clinker to a raw mix, such as generally employed in the making of standard Portland cement, for example, a mixture of lime rock and clay, or lime rock and shale, or marl and sea shells and clay in proper proportions. While the invention is not limited to the employment of any minimum or maximum amount of this ground clinker which is to be added to the raw mix previous to calcining and clinkering the raw mix, I have obtained the best results by adding 20 per cent. of ground clinker to a properly proportioned mixture of raw materials as enumerated above of the proper analysis for the manufacture of standard Portland cement. I have so far determined that favorable results may be obtained by using amounts of ground clinker varying from 5 per cent. to 25 per cent. and it appears that other percentages outside of this range would also produce favorable results.

After the ground clinker is added to the raw mix, it is then burned as is the standard Portland cement and processed in the usual manner to make a Portland cement, namely, by burning the mixture of raw mix and ground clinker, to a clinker, grinding the clinker, and adding sufficient calcium sulfate to give a required set.

By the above method of manufacturing Portland cement, it is found that the raw mix is more readily clinkered, can be clinkered at a somewhat lower temperature, and the finished cement has increased strength and hardening properties over the standard Portland cement. Particularly, the finished cement possesses high early tensile strength and high early compression strength.

The invention is not necessarily limited to the particular process heretofore described but includes all such modifications and changes and substitution of equivalents as come within the scope of the appended claims.

I claim:

1. A process of manufacturing Portland cement which comprises burning a Portland cement mix to form a clinker, grinding the clinker, and adding such ground clinker to a raw cement mix to form a granular mixture therewith, and burning the admixture thus produced to form a clinker.

2. A process of manufacturing Portland cement which comprises burning a cement mix to a clinker, grinding the clinker, adding to a raw cement mix 5 to 25 per cent. of the ground clinker to form an intimate mixture therewith, and burning the admixture to clinker the same.

3. A process of manufacturing Portland cement which comprises burning a cement mix to a clinker, grinding the clinker, adding to a raw cement mix approximately 20 per cent. of the ground clinker to form an intimate mixture therewith, and burning the admixture to form a clinker.

4. A process of the class described, which comprises burning a cement mix to form a clinker, grinding the clinker, adding the same to an unclinkered cement mix in the proportions of approximately 5 to 25 per cent. of the unclinkered cement mix, and burning the admixture to form a clinker.

5. In a continuous process of manufacturing Portland cement the steps of calcining a raw cement mix together with added ground Portland cement clinker to form a clinker therefrom, and then grinding such clinker.

6. In a continuous process of manufacturing Portland cement the steps of calcining a raw cement mix together with added ground Portland cement clinker in an unhydrated condition to form a clinker therefrom, and then grinding such clinker.

7. In a continuous process of manufacturing Portland cement the steps of mixing ground Portland cement clinker in an unhydrated condition with a raw cement mix, calcining the mixture to form a clinker therefrom, and then grinding such clinker.

Signed at Los Angeles, Calif., this 25 day of January, 1926.

JAMES H. COLTON.